(12) United States Patent  
Goldin et al.

(10) Patent No.: US 8,186,283 B2  
(45) Date of Patent: May 29, 2012

(54) CRADLE AND LEG JOINTS FOR CUSTOMIZABLE FURNITURE

(76) Inventors: Michael Goldin, Berkeley, CA (US); Steven Goldin, Berkeley, CA (US)

( * ) Notice: Subject to any disclaimer, the term of this patent is extended or adjusted under 35 U.S.C. 154(b) by 298 days.

(21) Appl. No.: 12/463,350

(22) Filed: May 8, 2009

(65) Prior Publication Data

US 2009/0277361 A1    Nov. 12, 2009

Related U.S. Application Data

(60) Provisional application No. 61/051,658, filed on May 8, 2008.

(51) Int. Cl.  
     *A47B 13/00*        (2006.01)

(52) U.S. Cl. ............... 108/153.1; 248/228.6; 248/230.6

(58) Field of Classification Search .................. 108/154, 108/153.1, 180, 187, 158.12, 158.13; 248/188, 248/229.25, 229.21, 229.15, 228.6, 231.7, 248/231.71; 403/256, 257, 387, 403, 205, 403/234; 312/265, 263, 257 A, 257 R  
See application file for complete search history.

(56) References Cited

U.S. PATENT DOCUMENTS

| | | | | |
|---|---|---|---|---|
| 591,620 A * | 10/1897 | Buchanan | ...................... | 403/241 |
| 1,232,565 A * | 7/1917 | Karn | ........................... | 248/228.1 |
| 1,473,504 A * | 11/1923 | Richard | ...................... | 248/228.3 |
| 1,974,628 A * | 9/1934 | Donald | ........................ | 248/228.3 |
| 2,933,567 A * | 4/1960 | Mageoch | .................... | 248/228.2 |
| 2,970,798 A * | 2/1961 | Friotchle et al. | ......... | 248/229.25 |
| 3,747,885 A * | 7/1973 | Ciancimino | ............... | 248/188.1 |
| 4,033,539 A * | 7/1977 | Bardocz | ..................... | 248/228.6 |
| 4,650,263 A * | 3/1987 | Monaghan et al. | .......... | 108/154 |
| 5,104,079 A * | 4/1992 | Hardtke | ........................ | 403/387 |
| 2002/0059889 A1* | 5/2002 | Fangmann | ............... | 108/157.17 |
| 2006/0151676 A1* | 7/2006 | Harvey | ..................... | 248/229.15 |
| 2007/0138361 A1* | 6/2007 | Poce | ........................... | 248/228.6 |

* cited by examiner

*Primary Examiner* — Jose V Chen  
(74) *Attorney, Agent, or Firm* — Beeson Skinner Beverly, LLP

(57) ABSTRACT

A cradle joint for customizing furniture comprises a recess in a horizontal support bracket, the recess defined by two opposing jaws forming a top opening, two angled support ribs, and a bottom bar, two rod cams disposed in the recess adjacent the side walls and movable between rod cam clearance pockets disposed below the jaws and lower corner regions adjacent the bottom bar, the bottom bars having inclined apertures for receiving threaded fasteners, the fasteners threadedly received in the rod cams, a cross beam have an I-shaped profile, two upper flanges and two lower flanges, the cross beam received in the recess perpendicularly to the support bracket and secured in the recess by tightening the rod cams into overlocking engagement with the oblique upper portions of the outer edges of the lower flanges.

13 Claims, 9 Drawing Sheets

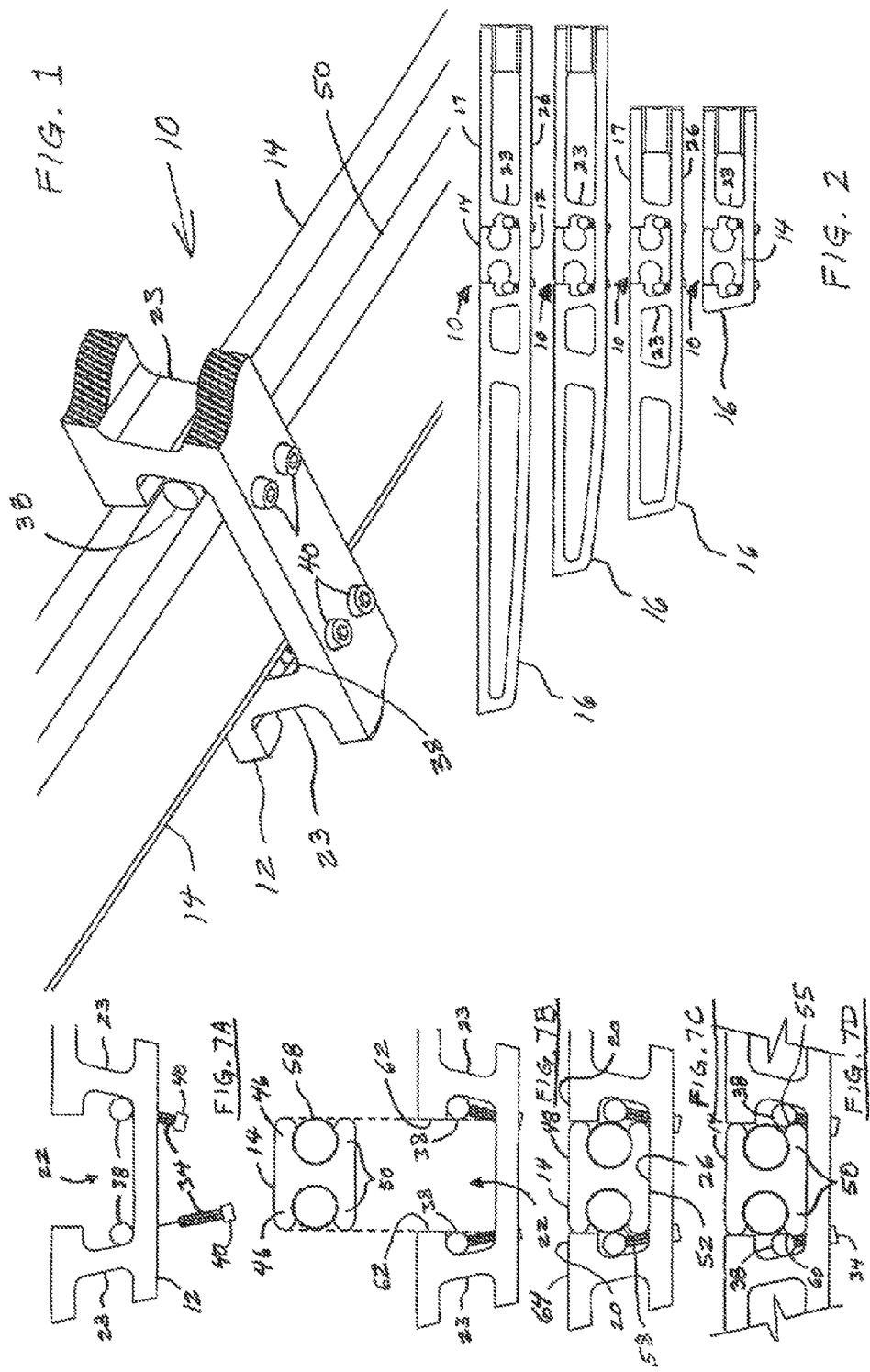

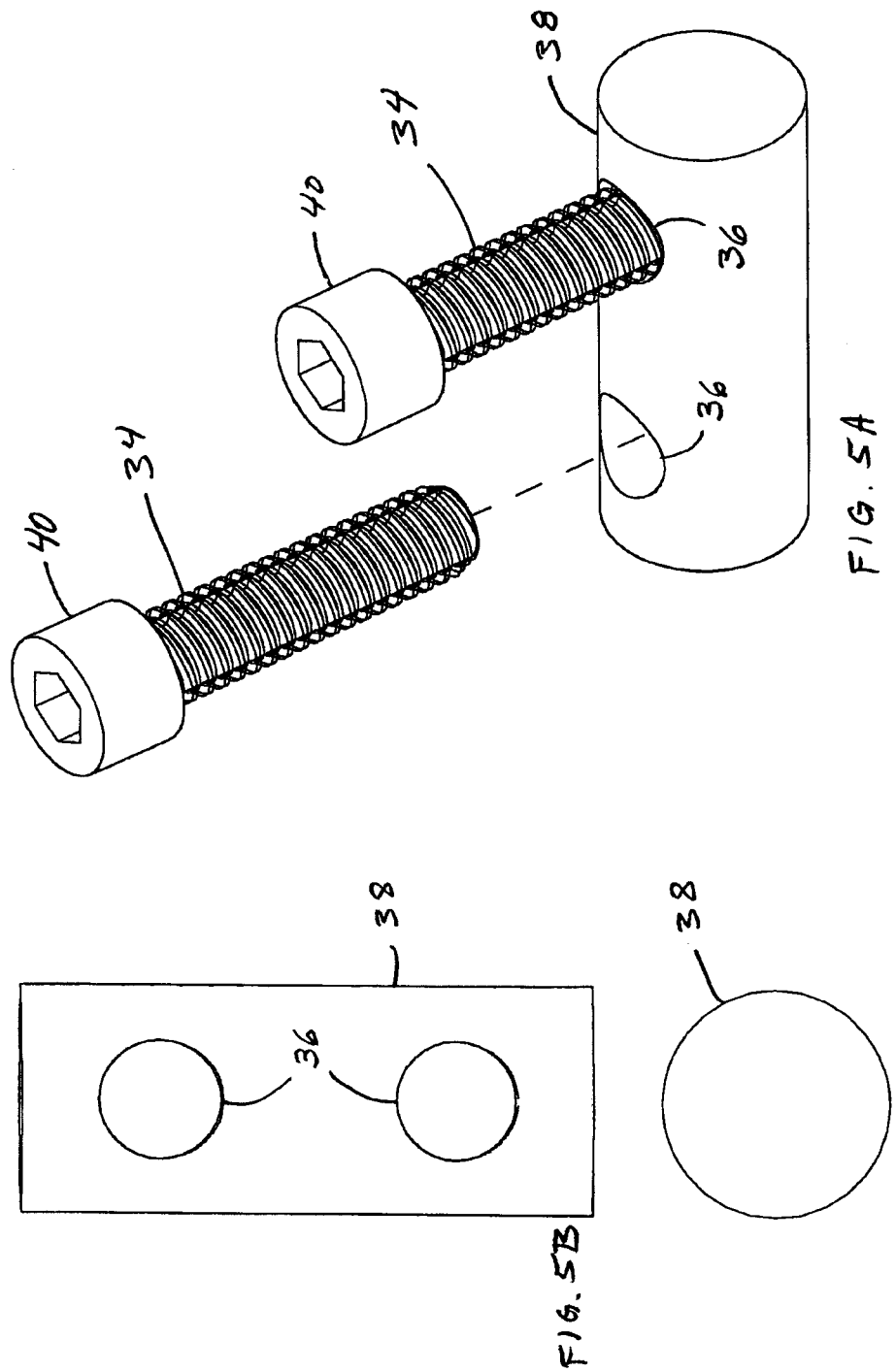

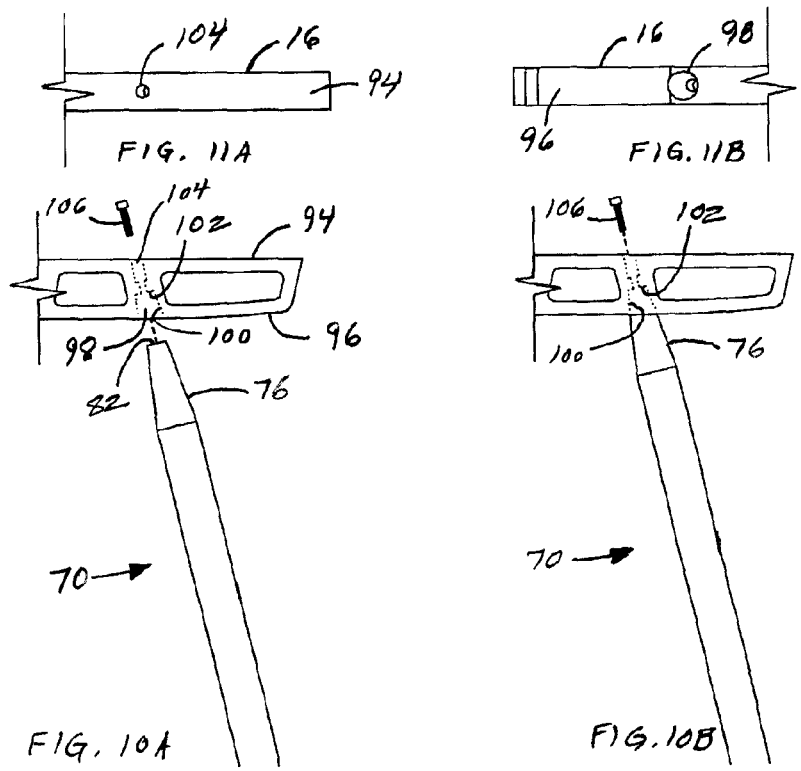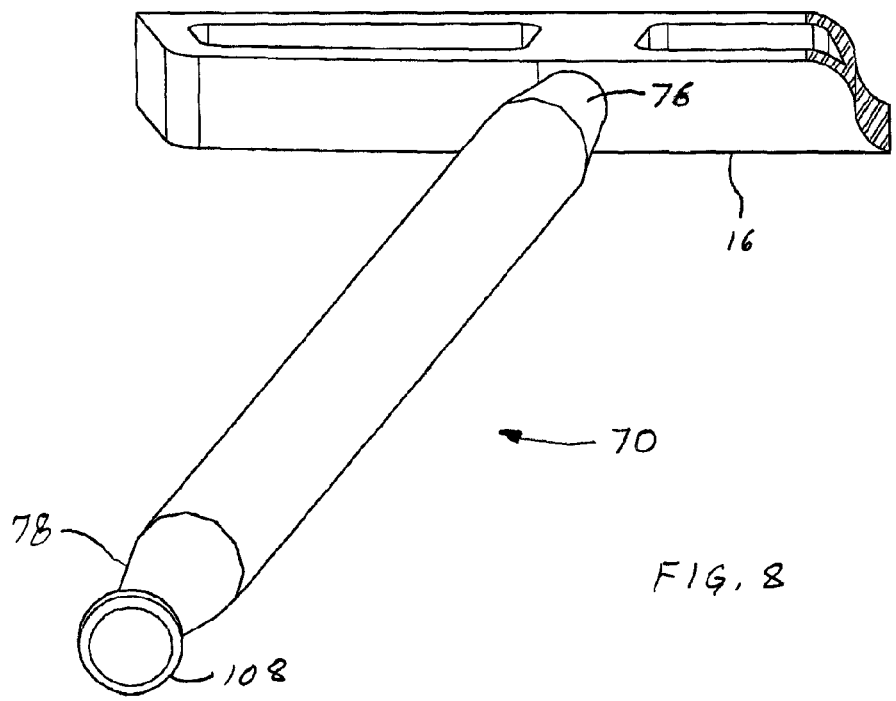

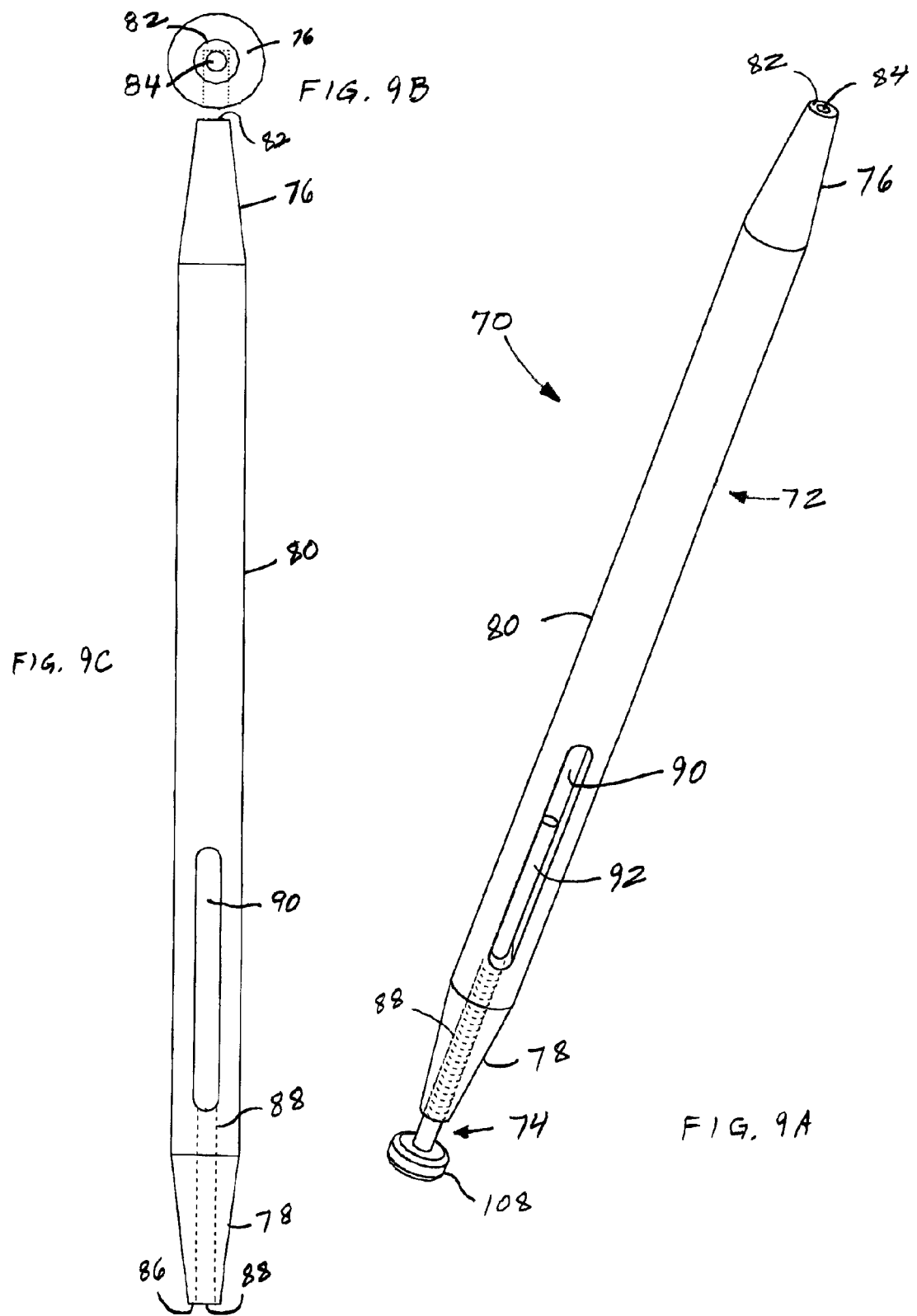

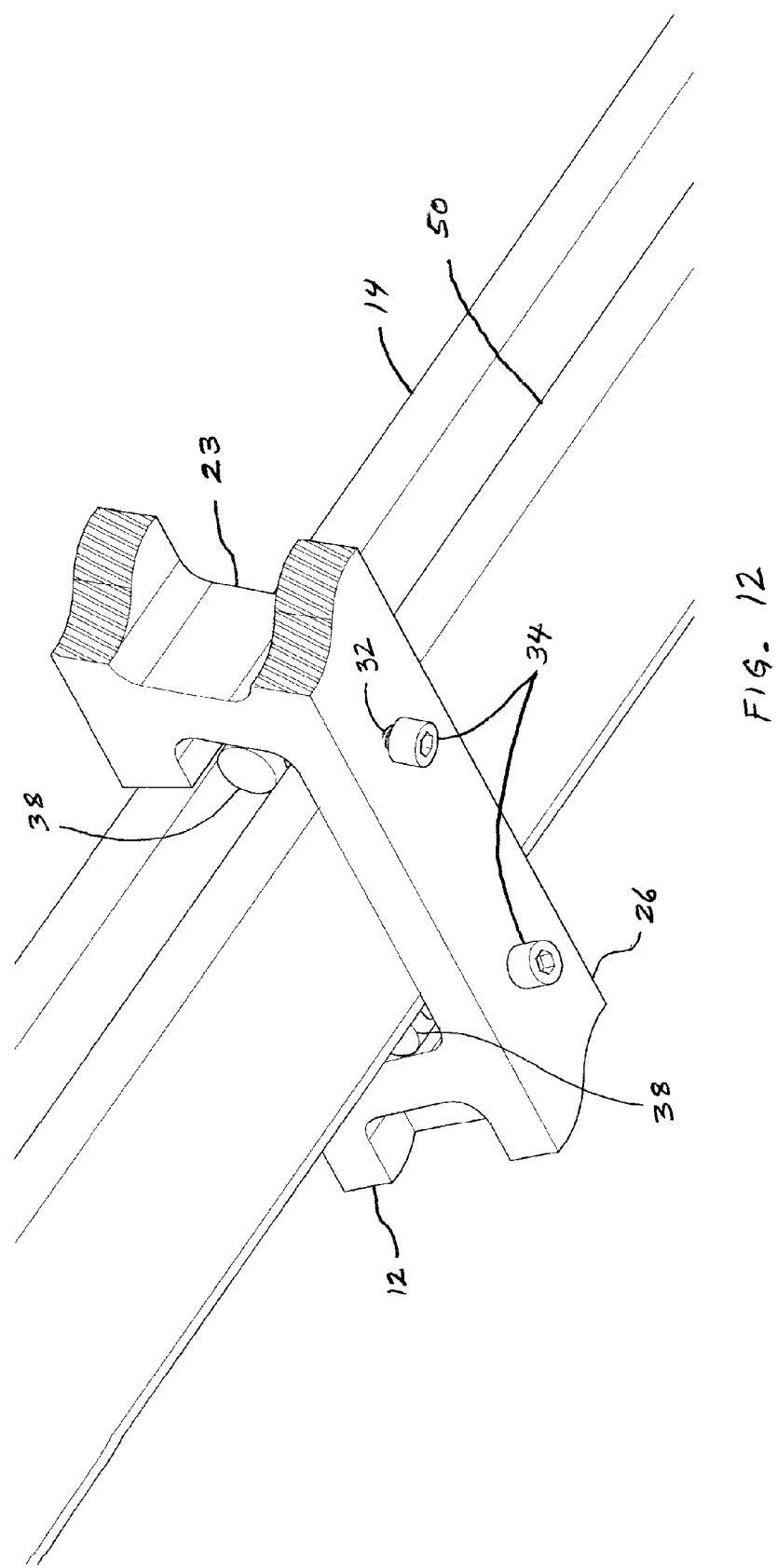

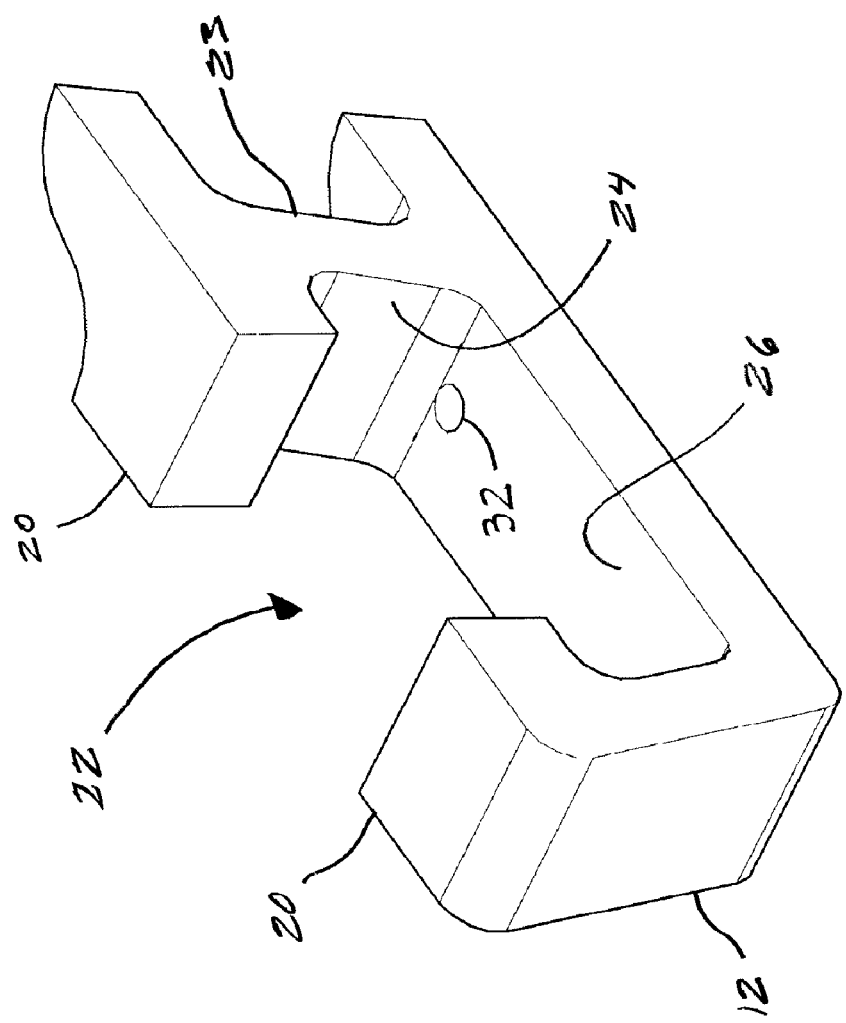

US 8,186,283 B2

CRADLE AND LEG JOINTS FOR CUSTOMIZABLE FURNITURE

CROSS-REFERENCE TO RELATED APPLICATIONS

This application claims the benefit of U.S. Provisional Application No. 61/051,658 filed May 8, 2008.

FIELD OF THE INVENTION

This invention is directed to customizable furniture and in particular to an improved cradle joint used in the construction of such furniture for providing a high degree of strength and versatility in the furniture product.

BRIEF DESCRIPTION OF THE DRAWINGS

FIG. 1 is a lower perspective view of a cradle joint according to the invention.

FIG. 2 is a side elevational view of the cradle joint shown in FIG. 1 incorporated in several exemplary support brackets of varying lengths.

FIG. 5A is an exploded upper perspective view of a rod cam and socket cap screws of the cradle joint.

FIG. 5B is a top plan view of the rod cam shown in FIG. 5A.

FIG. 5C is an end view of the rod cam shown in FIGS. 5A-5B.

FIG. 7A is a side elevational view of the cradle joint shown in FIG. 1 with rod cams resting in the lower corner regions of the cradle.

FIGS. 7B-7D are side elevational views showing various stages of insertion into and securing of the beam into the cradle to form the cradle joint shown in FIG. 1.

FIG. 8 is a lower perspective view of a leg attached to a support bracket, according to the invention.

FIG. 9A is an upper perspective view of the leg shown in FIG. 8.

FIG. 9B is a top plan view of the leg shown in FIGS. 8 and 9A.

FIG. 9C is a side elevational view of the cylindrical rod of the leg shown in FIGS. 8, 9A and 9B.

FIG. 10A is an exploded side elevational view of a support bracket, leg and cap screw.

FIG. 10B is an exploded side elevational view of the support bracket and screw shown in FIG. 10A, with the leg inserted into a conical pocket in the bracket.

FIG. 11A is a top plan view of the support bracket showing a counter-sunk through-hole.

FIG. 11B is a bottom plan view of the support bracket showing a conical pocket.

FIG. 12 is a lower perspective view of another embodiment of a cradle joint according to the invention.

FIG. 13 is another perspective view of a cradle element of the cradle joint shown in FIG. 12.

DESCRIPTION OF THE ILLUSTRATED EMBODIMENT

Figure 3:
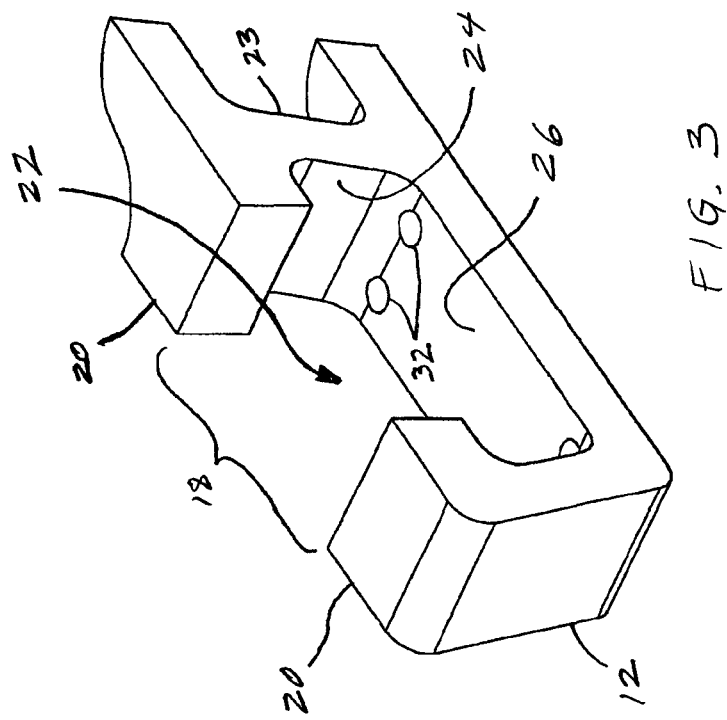
FIG. 3 is an upper perspective view of a cradle element of the cradle joint shown in FIG. 1.

A cradle joint according to the invention for securing to a beam in a desired location is generally indicated at 10 in FIG. 1 and comprises a cradle 12 and support beam 14 which rests in and is captured by cradle 12. As seen in FIG. 2, the cradle 12 may be a part of any one of a number of different support brackets 16 of varying lengths. However, each support bracket 16 includes a top bar 17 and a bottom bar 26 which is spaced below and extends in parallel alignment with the top bar 17. Support ribs 23 extend between and join top and bottom bars 17, 26.

Figure 4:
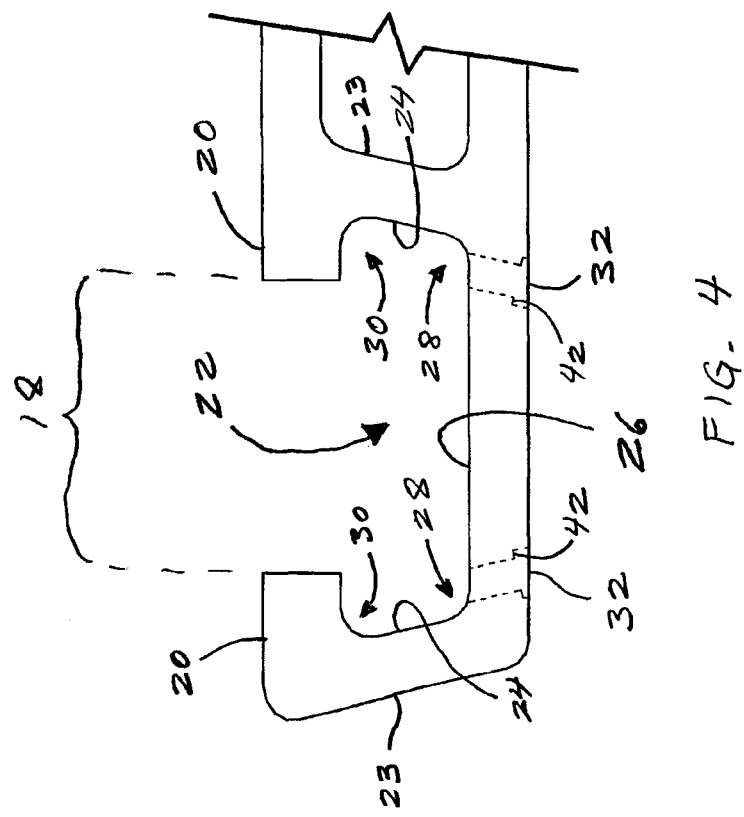
FIG. 4 is a side elevational view of the cradle shown in FIG. 3.

With reference now to FIGS. 3 and 4, the cradle 12 has a cradle opening 18 defined by two opposing jaws 20, the opening 18 providing topside access to recess 22. Recess 22 is bounded by opening 18, jaws 20, support ribs 23 having angled side walls 24 and bottom bar 26. Two rounded lower corner regions 28 are defined by the lower portions of each angled side wall 24 and bottom bar 26. Two rounded cam rod clearance pockets 30 are defined by the upper portions of each angled side wall 24 and the undersurfaces of jaws 20. Four counter-bored apertures 32 extend through the bottom bar 26 at an angle generally parallel with angled side walls 24. Each of the four apertures 32 has a diameter sized to freely receive the threaded portion of a socket cap screw 34 of the type shown in FIG. 5A. With additional reference to FIGS. 5B-5C, each socket cap screw 34 is threaded into one of two threaded apertures 36 of a rod cam 38. Each rod cam 38 is initially disposed in a resting position in one of the lower corner regions 28 of recess 22 as shown in FIG. 7A. The head 40 of each screw 34 is prevented from entering through-holes 32 by counter-bored stop face 42 as may best be appreciated by reference to FIGS. 1 and 4.

Figure 6A:
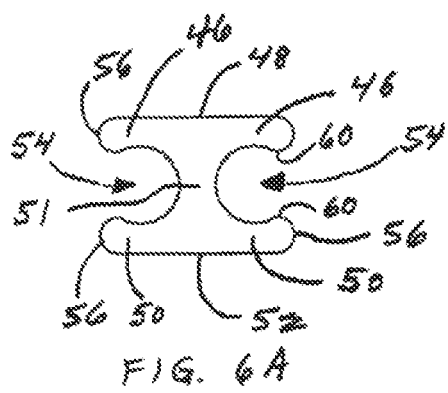
FIG. 6A is an end view of a beam of the cradle joint.
Figure 6B:
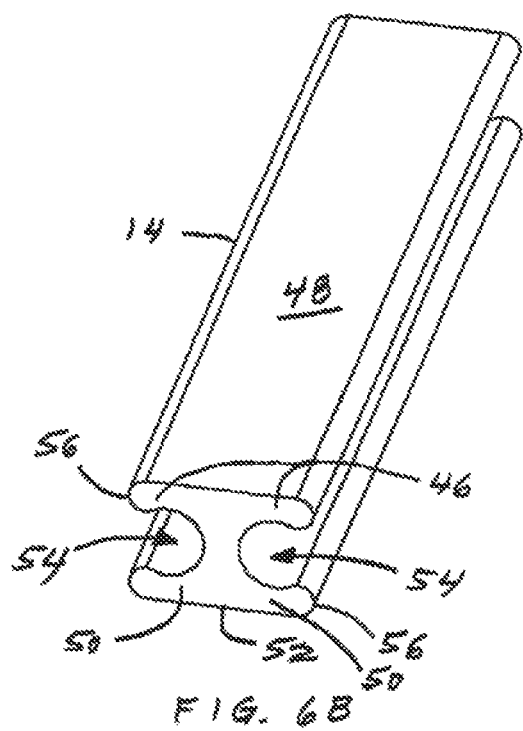
FIG. 6B is an upper perspective view of the beam shown in FIG. 6A.
Figure 6D:
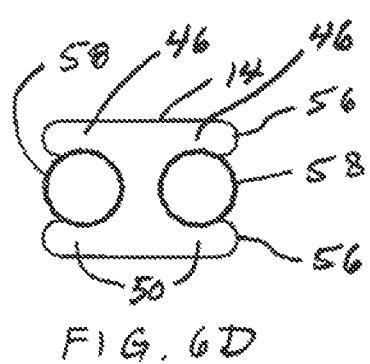
FIG. 6D is an end view of the conduit-fitted beam shown in FIG. 6C.
Figure 6C:
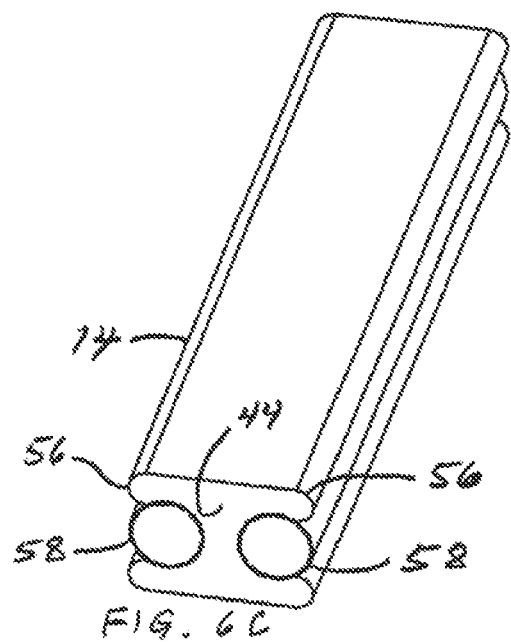
FIG. 6C is an upper perspective view of the beam shown in FIG. 6B with conduits fitted in channels of the beam.

Referring now to FIGS. 6A-6B, each beam 14 has a generally I-shaped profile comprising two upper beam flanges 46 collectively having an upper beam flange upper face 48, two lower beam flanges 50 having collectively a lower beam flange lower face 52, a center spine 51 extending between said upper and lower beam flanges 46, 50, and two oppositely disposed annular channels 54 between the upper and lower beam flanges 46, 50. The lateral edges 56 of each of the upper and lower beam flanges 46, 50 are rounded. Each of the two annular channels are sized to hold conduits 58, as shown in FIGS. 6C-6D. In the illustrated embodiment, the inner edges 60 (see FIG. 6A) of the edges 56 are spaced apart slightly less than the outer diameter of the conduit 58 such that, while the conduits may be slid into the channels 54 from end faces 44, the conduit 58 will be held in the channels by the more closely-spaced inner edges 60. It should be noted that the outer edge of conduit 58 when captured in channel 54 is in parallel alignment with the edges 56 as seen in FIG. 6D.

Turning to FIGS. 7B-7D, in preparation for inserting beam 14 into cradle recess 22, rod cams 38 are pushed up into clearance pockets 30. As shown in FIG. 7B, when the rod cams 38 are in this position, they are laterally recessed into the clearance pockets 30 sufficiently that the surface of the rod cams 38 are approximately aligned with or slightly recessed behind beam centering faces 62 such that beam 14 with conduits 58 may pass downwardly through the opening 18 of the cradle 12. FIG. 7C shows beam 14 seated in recess 22 with the lower beam flange lower face 52 resting on bottom bar 26. So seated, the upper beam flange upper face 48 is in parallel alignment with the top surface 64 of jaws 20. In FIG. 7D, rod cams 38 have been dropped down on the lower beam flanges 50 of beam 14. Thence socket cap screws 34 are tightened so that the rod cams 38 bear down on and are tensioned against the oblique upper part 55 of the edges 56 of the lower beam flanges 50 of the beam 14, thereby creating a compression fitting between the lower face 52 of the lower beam flange and the bottom bar 26 and securely holding the beam 14 in cradle 12 and completing the joint 10. Advantageously, as the rod cams 38 are moved from the clearance pockets 30 towards engagement with edges 56, they pass conduit 58 disposed in channels 54 without interference. In the illustrated embodiment, rod cams 38 are disposed immediately adjacent angled support walls 24 of ribs 23 such that angled support walls 24 provide lateral support when rod cams 38 engage edges 56 of lower beam flanges 50, thereby stabilizing and strengthening the joint connection, working to center beam 14 between the two rod cams 38 thus centering the beam 14 in the recess and holding the spine 51 of the cross beam 14 in perpendicular relation to the bottom bar 26 of the bracket 16. It will also be seen in FIG. 7C that the upper beam flanges 46 are closely interposed between the beam centering faces 62 of jaws 20 such that the upper beam flanges 46 are restricted against lateral movement and thus stabilizing beam 14 in the cradle 12.

It will be appreciated that the cradle joint 10 may be used to secure the beam 14 while the cradle 10 is in an inverted position. Whether inverted or in the upright position, the beam 14 may be adjusted longitudinally in cradle 12 without modifying beam 14 or cradle 12.

FIG. 8 depicts a furniture leg 70, according to the present invention, designed to matingly engage with support brackets 16 of the type that are connected to furniture columns described in U.S. Provisional Patent Application No. 61/051, 091 by Goldin which is hereby incorporated by reference.

Referring now to FIG. 9A, leg 70 comprises a cylindrical rod 72 and leveling screw 74. The cylindrical rod 72 has a top tapered portion 76, a bottom tapered portion 78, and a main body 80. The top tapered portion 76 has a flat top face 82 (also see FIG. 9B) and a downwardly extending threaded top hole 84 for receiving a cap screw. As seen in FIG. 9C, bottom tapered portion 78 has a flat bottom terminal end 86 and a threaded bottom hole 88 extending upwardly from the bottom terminal end 86 through the bottom tapered portion 78 to slot 90 in the main body 80. The leveling screw 74 is threaded into the bottom hole 88 so that a top portion 92 of the screw may be exposed in slot 90.

As shown in FIGS. 11A-11B, each support bracket 16 has a top side 94 and a bottom side 96. Now referring to FIGS. 10A-10B, bracket 16 has a conical pocket 98 extending upwardly from the bottom side 96 at an angle. The conical pocket 98 has tapered sides 100 and an inner face 102. The tapered sides 100 are formed at an angle corresponding to the taper of the top taper portion 76 of rod 72. A counter-sunk through-hole 104 extends at an angle corresponding to the longitudinal dimension of the leg 70 from the top side 94 of the bracket 16 and communicates with the conical pocket 98.

The leg 70 is joined to the bracket 16 by inserting the top tapered portion 76 of the leg 70 into the conical pocket 98 of the bracket 16. When fully inserted, the top face 82 of the top tapered portion 76 is slightly spaced from the inner face 102 of conical pocket 98. A cap screw 106 is inserted into the counter-sunk through-hole 104 from the top side 94 of the bracket 16 and then threaded into the top hole 84 (FIG. 9A) of the top tapered portion 76 of the leg 70. Tightening cap screw 106 pulls the top tapered portion 76 into conical pocket 98 creating an extremely rigid moment connection between top tapered portion 76 and the tapered sides 100 of the conical pocket 98.

Figure 14A:
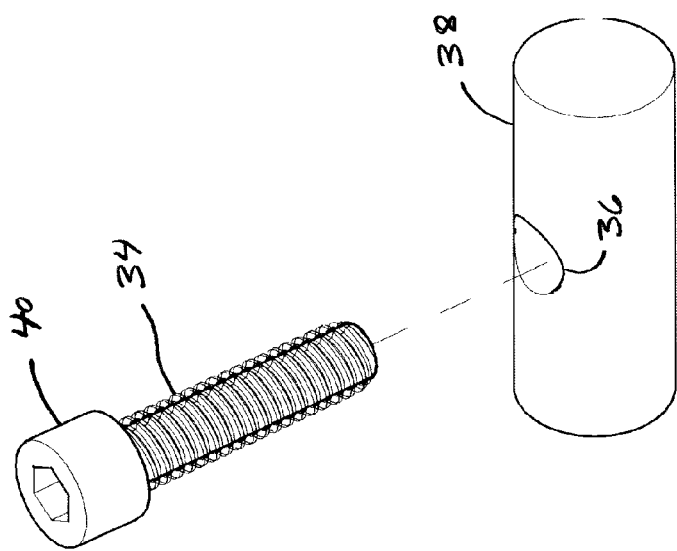
FIG. 14A is an exploded upper perspective view of a rod cam and socket cap screw of the alternate embodiment of a cradle joint shown in FIG. 12.
Figure 14B:
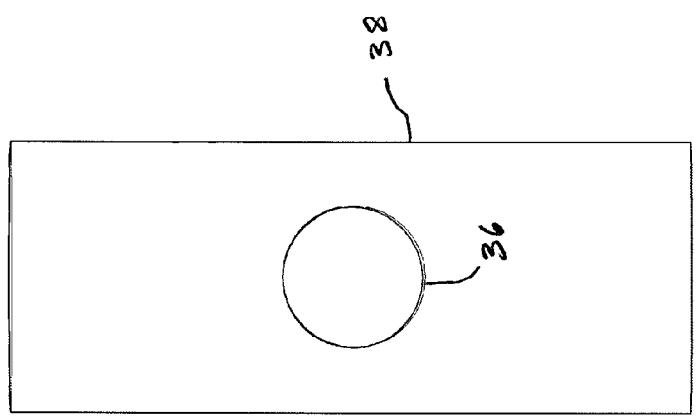
FIG. 14B is a top plan view of the rod cam shown in FIG. 14A.
Figure 14C:
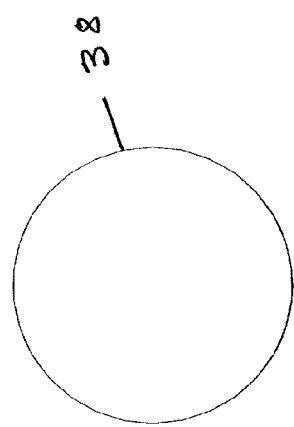
FIG. 14C is an end view of the rod cam shown in FIGS. 14A-14B.

A swiveling foot 108 is attached to the bottom end of leveling screw 74 such that, once leg 70 is attached to bracket 16 as described above, screw 74 may be tightened or untightened to bring foot 108 into contact with a supporting surface in a well known manner. FIGS. 12-13 illustrate an alternate embodiment of the invention similar to that illustrated in FIGS. 1-11B, except that the bottom bar 26 of cradle 12 only has two counter-bored apertures 32 instead of four. Correspondingly, there are only two screws 34, each of which extends into one of the rod cams 38. As shown in FIGS. 14A-14B, rod cam 38 is provided with only one threaded aperture for receiving one of the screws 34.

There have thus been described certain preferred embodiments of cradle and leg joints for customizable furniture. While preferred embodiments have been described and disclosed, it will be recognized by those with skill in the art that modifications are within the true spirit and scope of the invention. The appended claims are intended to cover all such modifications.

We claim:

1. A cradle joint for customizing furniture, the cradle joint comprising:
   a horizontal support bracket having a top bar, a bottom bar spaced below and in parallel alignment with said top bar, and at least two support ribs extending between said top and bottom bars, said top bar having a cradle opening bounded by opposing jaws,
   a recess in communication with said cradle opening, said recess defined by said jaws, said support ribs and said bottom bar, said recess having two lower corner regions and two rod cam clearance pockets, said lower corner regions adjacent said bottom bar, and said rod cam clearance pockets adjacent said jaws,
   said bottom bar having at least two spaced apart apertures, at least one of said apertures inclined at an acute angle relative to vertical,
   a threaded fastener freely received in each of said apertures,
   two rod cams each having at least one threaded hole, each rod cam disposed in said recess, said fastener threadedly received in said hole, rotation of said fasteners moving said rod cams between said lower corner regions and said rod cam clearance pockets along paths parallel with said apertures,
   a cross beam having a generally I-shaped profile and two lower beam flanges, said lower beam flanges having lateral edges having oblique upper portions, said lower beam flanges defining a lower cross beam width narrower than said cradle opening,
   when disposed in said rod cam clearance pockets said rod cams spaced apart a distance at least as great as said cradle opening such that said cross beam is freely insertable through said opening into said recess, said cross beam movable downwardly in said recess to a seated position in which said lower beam flanges are resting on said bottom bar, and when said cross beam is in said seated position tightening of said fasteners bringing said rod cams down into engagement with said oblique upper portions of said lateral edges of said lower beam flanges such that said cross beam is firmly secured in said recess.

2. The cradle joint of claim 1 wherein:
said recess has a top portion and a bottom portion, and
said support ribs are inclined at acute angles relative to vertical such that said top portion is wider than said bottom portion.

3. The cradle joint of claim 2 wherein:
said lower corner regions are defined by the intersection of said bottom bar and said support ribs, and
said rod cam clearance pockets are defined by the intersections of said jaws and said support ribs.

4. The cradle joint of claim 2 wherein:
each said aperture is adjacent to and disposed in parallel alignment with one of said support ribs.

5. The cradle joint of claim 2 wherein:
said support ribs have angled side walls,
said rod cams have inner and outer sides, said outer sides of said rod cams in immediately adjacent disposition to said angled side walls, and when said fasteners are tightened and said inner sides of said rod cams are brought into engagement with said upper portions of said lateral edges of said lower beam flanges, said outer sides of said rods cams are restrained against outward movement by said angled side walls.

6. The cradle joint of claim 1 wherein:
said top bar of said support bracket has a support bracket top surface, and
said cross beam has two upper beam flanges defining an upper cross beam width slightly narrower than said cradle opening, said upper beam flanges having an upper beam face, and when said cross beam is in said seated position, said upper beam face is in flush disposition with said support bracket top surface.

7. The cradle joint of claim 1 wherein:
said cross beam has two upper beam flanges and two oppositely disposed annular channels between said upper and lower beam flanges for holding conduit, each said channel having an arc greater than 180° for retaining a conduit slidingly received in said channel.

8. The cradle joint of claim 7 wherein:
said bottom flanges each have lateral edges, and
a conduit received in one of said channels has an outer edge extending no further than said lateral edges.

9. The cradle joint of claim 1 wherein:
said fastener has a fastener head, and each aperture has a counterbore stop face for limiting entry of said fastener head into said aperture.

10. The cradle joint of claim 1 wherein:
tightening of said fasteners when said cross beam is in said seated position creating a compression fitting between said lower beam flanges and said bottom bar.

11. The cradle joint of claim 10 wherein:
said lower beam flange has a lower face, and
said compression fitting is between the lower face of said lower beam flanges and said bottom bar.

12. The cradle joint of claim 10 wherein:
said cross beam has two upper beam flanges and a center spine extending between said upper and lower beam flanges, and
tightening of said fasteners when said cross beam is in said seated position centers said cross beam in said recess and holds the spine of said cross beam in perpendicular relation to the bottom bar of said bracket.

13. The cradle joint of claim 1 wherein:
said cross beam has two upper beam flanges,
said jaws have spaced apart beam centering faces, and
when said cross beam is in said seated position said upper beam flanges are closely interposed between the beam centering faces of said jaws for restricting said upper beam flanges against lateral movement.

\* \* \* \* \*